US012024410B1

(12) United States Patent
Craig

(10) Patent No.: US 12,024,410 B1
(45) Date of Patent: Jul. 2, 2024

(54) HANDHELD LIFTING DEVICE

(71) Applicant: Chad W Craig, O'Fallon, MO (US)

(72) Inventor: Chad W Craig, O'Fallon, MO (US)

( * ) Notice: Subject to any disclaimer, the term of this patent is extended or adjusted under 35 U.S.C. 154(b) by 0 days.

(21) Appl. No.: 18/545,828

(22) Filed: Dec. 19, 2023

Related U.S. Application Data

(60) Provisional application No. 63/435,374, filed on Dec. 27, 2022.

(51) Int. Cl.
*B66F 19/00* (2006.01)

(52) U.S. Cl.
CPC .................................... *B66F 19/00* (2013.01)

(58) Field of Classification Search
CPC ....................................................... B66F 19/00
See application file for complete search history.

(56) References Cited

U.S. PATENT DOCUMENTS 1,212,190 A * 1/1917 Davis ........................ A45F 5/10 269/130
2,915,233 A 12/1959 Moomaw
3,012,809 A * 12/1961 Tremaine .................. A45F 5/10 294/157
3,606,441 A * 9/1971 Ridgely .................... B66C 1/14 414/626
3,794,370 A * 2/1974 Lockhart .............. B65D 23/106 215/396
4,116,374 A 9/1978 Garello
4,336,899 A 6/1982 Price
4,667,359 A * 5/1987 Polotti ...................... B67B 7/44 215/396
5,255,947 A 10/1993 Schwartz
5,531,495 A 7/1996 Hohman
6,729,665 B1 5/2004 Posey et al.
7,284,777 B1 10/2007 Kraemer
7,311,343 B2 * 12/2007 Callebresi ................. A45F 5/10 294/157
7,399,017 B1 7/2008 Lasseigne
D581,162 S 11/2008 Walker et al.
8,177,203 B2 5/2012 Alexander
D704,937 S 5/2014 Cutler
9,856,052 B2 1/2018 O'Leary et al.
10,450,105 B2 10/2019 Luburic (Continued)

OTHER PUBLICATIONS

Easy-Carry [online]. Wrap-It Storage, Nov. 7, 2023. Retrieved from the Internet: <URL: https://wrapitstorage.com/collections/easy-carry>.

(Continued)

*Primary Examiner* — Stephen A Vu
(74) *Attorney, Agent, or Firm* — CreatiVenture Law, LLC; Dennis J M Donahue, III

(57) ABSTRACT

A handheld lifting device provides a temporary handle designed for use with a container, such as a bucket, that allows a user to have a secure grip on the bottom of the bucket which results in better pouring control and less finger fatigue while pouring. In the preferred embodiment, the handle includes a nylon strap with hooks at either end and a cam buckle tensioner between the opposing ends to vertically attach to a 5-gallon bucket with an upper hook looping over the rim on the top of the container and the lower hook looping over the lip on the bottom of the bucket. To provide a better grip for pouring, a grip section protrudes from the lower hook.

20 Claims, 7 Drawing Sheets

(56) References Cited

U.S. PATENT DOCUMENTS

| | | | | |
|---|---|---|---|---|
| D927,186 | S | 8/2021 | Rees et al. | |
| 11,147,361 | B2 * | 10/2021 | Krivokapic ............... | A45F 5/10 |

OTHER PUBLICATIONS

Lift-All 5-Gallon Bucket Sling—BS5 [online]. Vehicle Safety Supply, Nov. 14, 2023. <URL: www.vehiclesafetysupply.com/lift-all-gallon-bucket-sling-bs5-p-158290.html>.

Bucket Strap [online]. Professional Choice, Nov. 7, 2023. Retrieved from the Internet: <URL: https://profchoice.com/i-7261683-bucket-strap.html>.

Nordfab Clamp, 10 in Duct Dia, Galvanized Steel, 22 GA, 10" W×17" L x [online]. Zoro Tools, Inc., Nov. 7, 2023. Retrieved from the Internet: <URL: www.zoro.com/nordfab-clamp-10-duct-size-3260-1000-100900/i/G7985607/>.

5 Gallon Steel Asphalt Service Bucket with Side Handle [online]. Best Materials LLC, Nov. 7, 2023. Retrieved from the Internet: <URL: www.bestmaterials.com/detail.aspx?ID=11481>.

How to Open and Dispense a 5 Gallon Pail of Material [online]. Smooth-On, Nov. 16, 2023. Retrieved from the Internet: <URL: www.youtube.com/watch?v=sSjsat31Af0>.

* cited by examiner

HANDHELD LIFTING DEVICE

CROSS-REFERENCE TO RELATED APPLICATIONS

This application claims priority from U.S. Provisional Patent Application No. 63/435,374 filed on Dec. 27, 2022 which is herein incorporated in its entirety.

STATEMENT REGARDING FEDERALLY SPONSORED RESEARCH

Not Applicable.

APPENDIX

Not Applicable.

BACKGROUND OF THE INVENTION

Field of the Invention

The present invention relates to a handheld lifting device, and more particularly to a handheld lifting device with a pair of hooks and a handle attached to one of the hooks for temporary use when lifting a container.

Related Art

Handheld lifting devices have long been used for lifting containers during transport as well as to assist a user in pouring contents from the container. For example, a standard five-gallon (5 gal.) bucket is designed to store, transport, and carry a product, often a liquid. The standard bucket typically includes a single U-shaped handle rotatably connected to the top section of the bucket on opposite sides of the bucket. Other versions of handles include a thick plastic strap with an integrated handle section. Generally, the rotating ends of the top handle create a pivot axis that extends through the sides of the bucket which allows a user to grab the gripping section, rotate the handle upwards and carry the bucket from above. Although these top hangers effectively allow the buckets to be carried, they are not very helpful to users when they want to tilt and pour the contents from buckets.

When these buckets are filled with typical liquids sold in these containers, such as paints, oils, lubricants, sealants, cleaners, and laundry detergents, they can weigh between forty to sixty pounds (40 lb.-60 lb.). When the user wants to pour the contents from the bucket, some manufacturers suggest placing the bucket on a table and laying the bucket on its side with the pouring spout at the twelve o'clock position; as the bucket is rotated and the pouring spout moves away from the twelve o'clock position, the liquid contained inside the bucket begins to pour out from the spout. A table or other elevated platform is not always available to help with pouring the contents from the bucket, and rotating the bucket on the ground is not satisfactory if the contents need to be poured into a hopper or other receptacle that is elevated above the ground. Similarly, tilting an upright bucket with one edge resting on the table or the ground is also not always an option.

Since the bottom of these buckets typically only have a ⅜" lip that make it hard for the user to grasp with their fingertips, it is difficult for users to lift and pour one of these large buckets, especially when it is full. Accordingly, there have been a number of inventions over the years which provide the user with a handheld lifting device with a handle at the bottom end of the bucket or on the side of the bucket which can help the user in lifting and pouring the contents from the container. Some of these known devices allow the user to connect a removable handle to the bucket, such as disclosed in U.S. Pat. Nos. 7,399,017, 7,284,777, 5,255,947, and 4,116,374 and in U.S. Des. Pat. Nos. D927,186, D704,937 and D581,162, and some large buckets are even produced with an integral bottom handle, such as disclosed in U.S. Pat. Nos. 10,450,105 and 9,856,052. Some of the removable lifting devices with handles are collapsible for easy storage, such as the '162 patent, the '937 patent, the '374 patent, and the '947 patent, but they only wrap around the circumference of the container and could slip off the bottom. Other removable lifting devices with handles engage the base of the bucket to more securely hold the container and help prevent the device from slipping off of the container, such as disclosed in the '017 patent and the '777 patent, but they are not collapsible. The handheld lifting device disclosed in the '186 patent is both collapsible and securely holds the container at both the top and at the bottom; however, this device requires a pair of straps that circumferentially wrap around the container on opposite sides of the handle.

It would be beneficial to provide a handheld lifting device that is collapsible and securely holds the container at both the top and at the bottom and which does not require any straps wrapping circumferentially around the container.

SUMMARY OF THE INVENTION

The handheld lifting device has a longitudinally extending body with hooks on opposite ends that respectively engage the top rim and the bottom lip of the container, such as a five-gallon (5 gal.) bucket, and the lower hook has a handle extending outward, away from the container. The longitudinally extending body has a fixed length section and a variable length section which are connected by a fastener which can shorten the variable length section and thereby pull the hooks toward each other from a loosened configuration to a tightened configuration. In the loosened configuration, the user can easily place the hooks onto the top rim and bottom lip and remove the hooks therefrom. In the tightened configuration, the handheld lifting device is securely mounted to the container, and the handle can be used to help lift the container and tilt the container for pouring out its contents.

In one aspect of the handheld lifting device, the handle is formed with sidewalls that extend outward from the lower hook, and the longitudinally extending body is formed by flexible straps that are collapsible and can be placed within the handle when the upper hook is removed from the container.

In another aspect of the present invention, one of the sidewalls for the handle has a notch in which the upper hook nests.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1A:
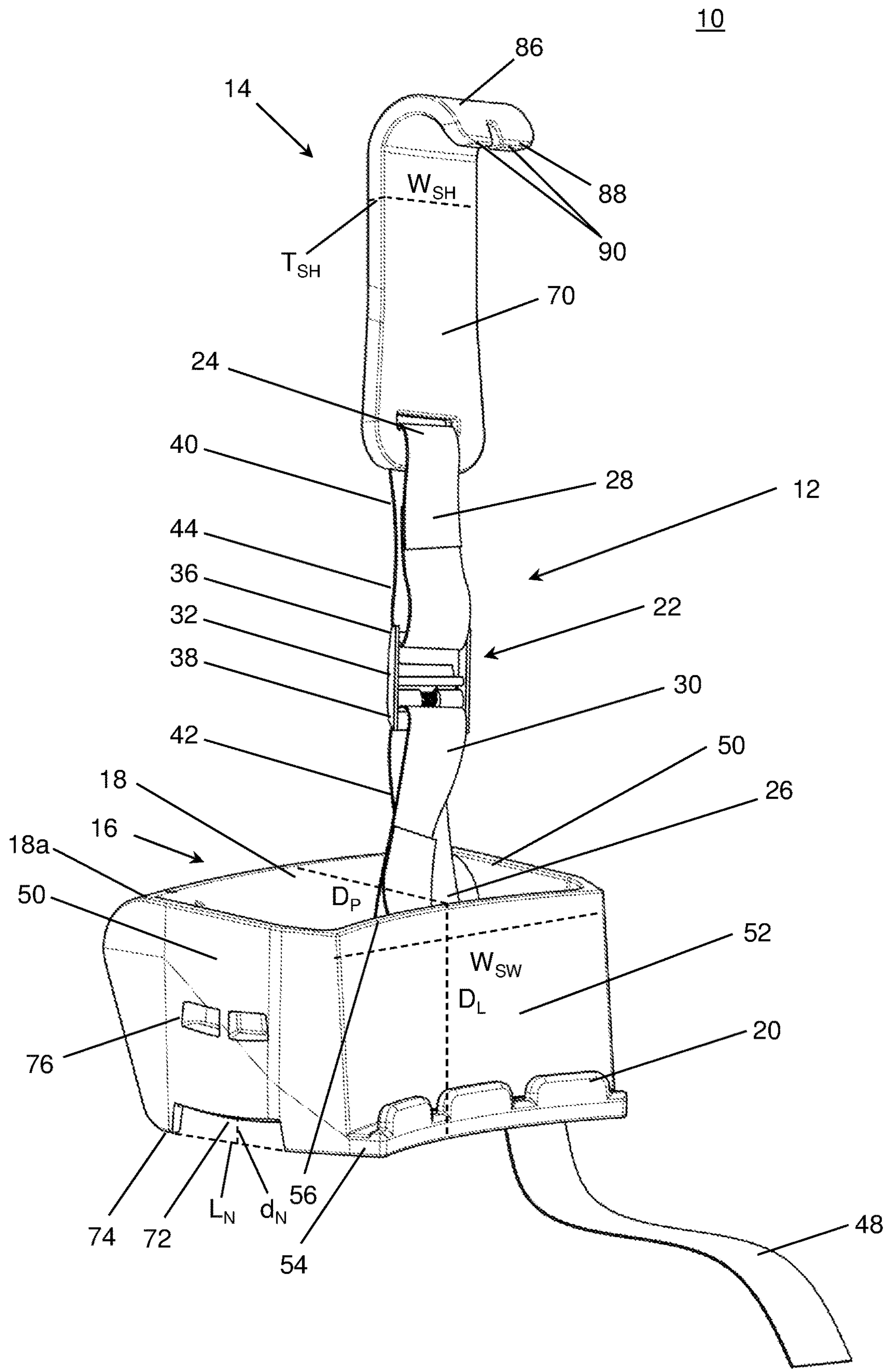
FIG. 1A is a perspective view of the handheld lifting device according to the present invention.

The following description of the preferred embodiment(s) is merely exemplary in nature and is in no way intended to limit the invention, its application, or uses.

The handheld lifting device 10 as shown in the drawings and described herein provides a temporary handle designed for use with a container 100, such as a bucket, that allows a user to have a secure grip on the bottom of the bucket to provide better pouring control and results in reduced fatigue in the user's fingers when gripping the bucket and pouring the contents from the bucket. The handheld lifting device generally includes a longitudinally extending body 12 that has an upper end 24, a lower end 26, a fixed length section 28 extending to one of the upper end and the lower end, and a variable length section 30 connected to the fixed length section and extending to the other of the upper end and the lower end. The upper end and the lower end are spaced by an extended distance ($D_E$) in a loosened configuration of the variable length section as shown in FIG. 1C and are spaced by a shortened distance ($D_S$) which in a tightened configuration of the variable length section as shown in FIG. 1D. Accordingly, the extended distance is greater than the shortened distance ($D_E>D_L$).

An upper hook 14 is fixedly attached to the upper end of the longitudinally extending body, and a handle 16 is fixedly attached to the lower end of the longitudinally extending body. The upper hook has a shank 70 extending to the head 86 of the hook. The handle has a grip 18 and a lower hook 20 attached to the grip. When the variable length section is in the loosened configuration, the upper hook and the lower hook releasably connect to the top rim 110 and the bottom lip 120 of the container, respectively. A fastener 22 operatively connects the variable length section to the fixed length section. The fastener adjusts the length of the variable length section so the upper hook and the lower hook can respectively clamp onto the top rim of the container and the bottom lip of the container in the tightened configuration and can respectively release from the top rim of the container and the bottom lip of the container in the loosened configuration.

Figure 1B:
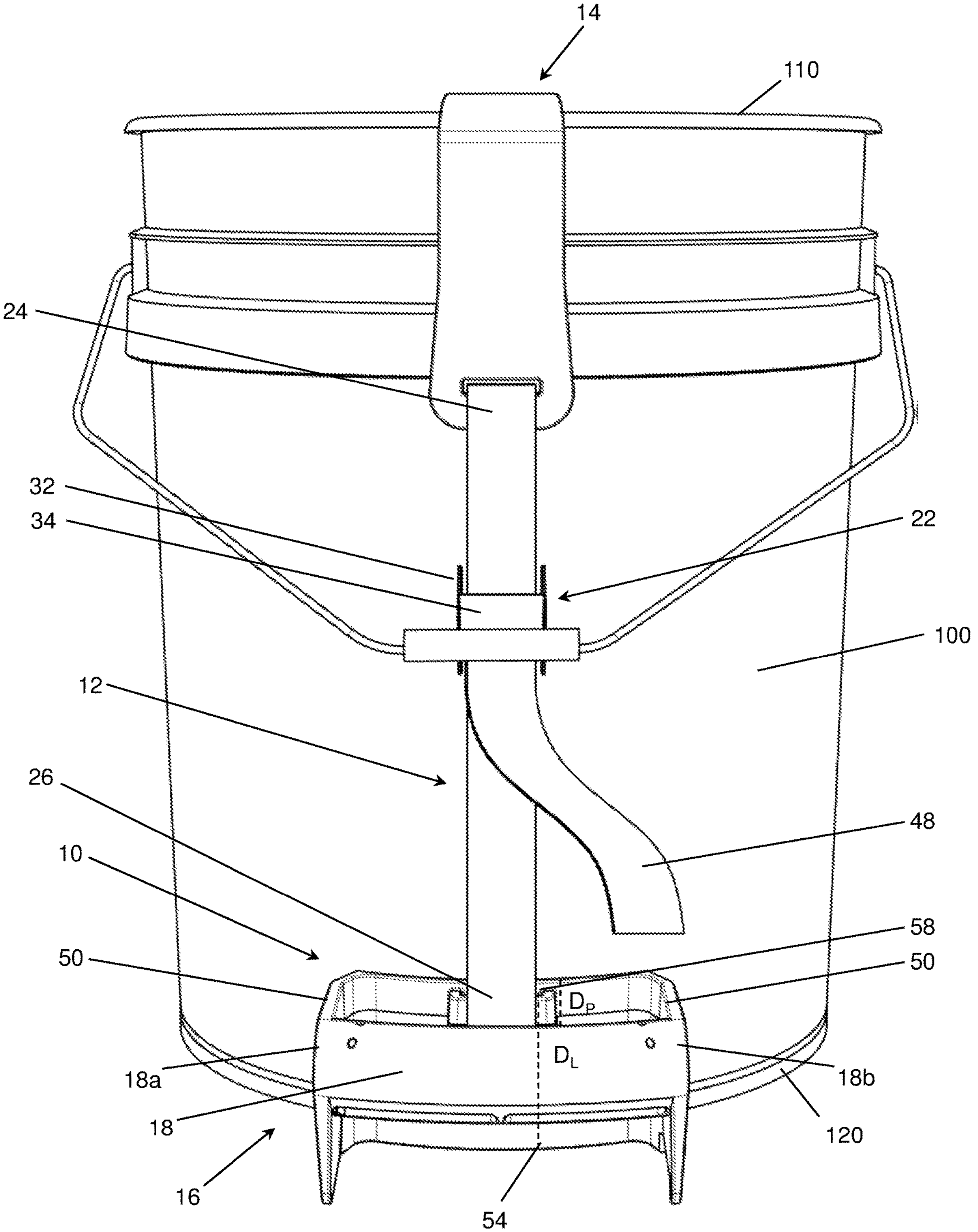
FIGS. 1B-1D are views of the handheld lifting device shown in FIG. 1 as placed on a bucket.
Figures 1C, 1D:
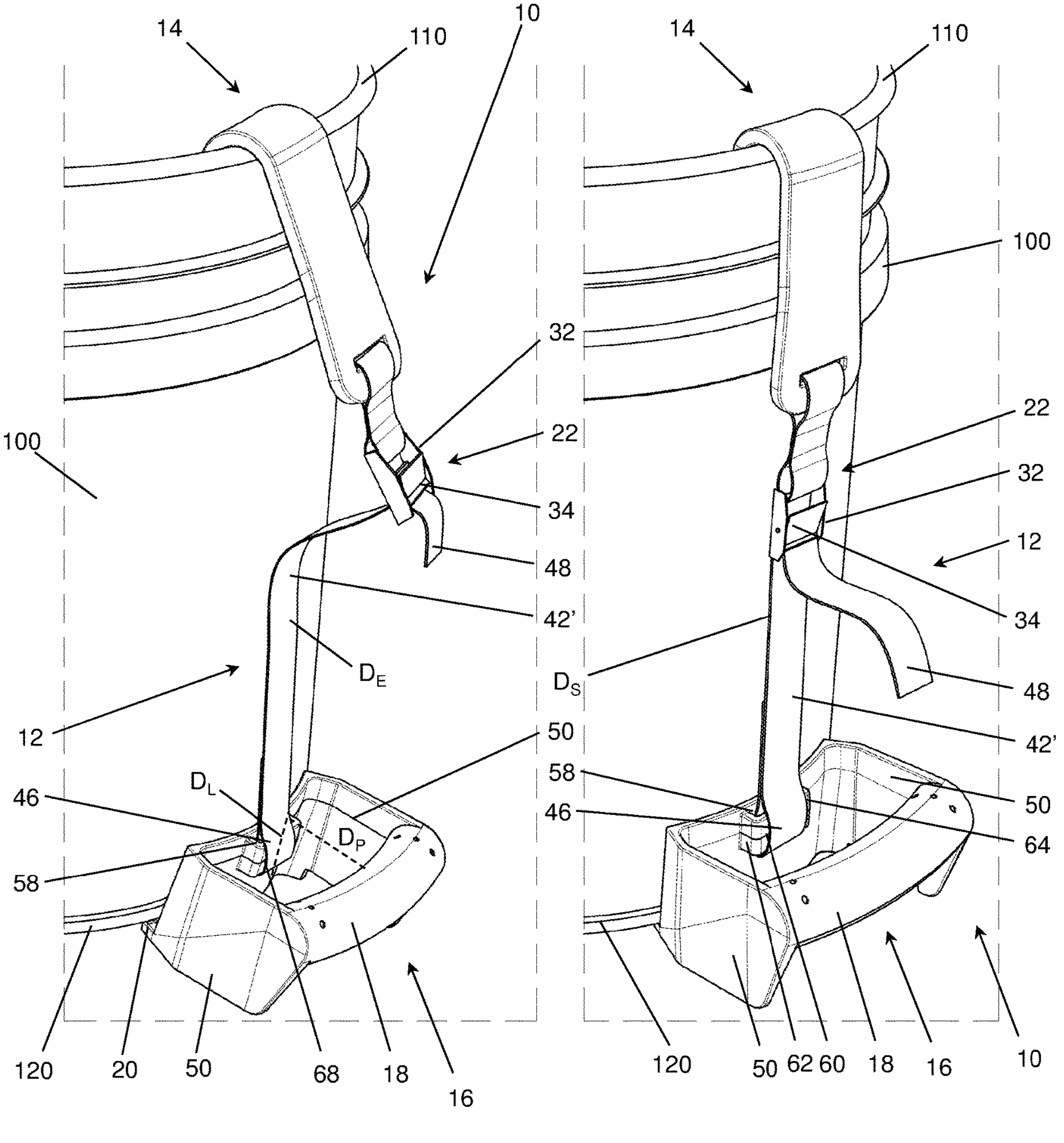

The preferred embodiment of the handheld lifting device is shown in FIGS. 1A-1G. In the preferred embodiment, the fastener is a buckle 32, preferably a cam buckle 34 with a strap connector 36 and a strap adjuster 38, and the fixed length section and the variable length section of the longitudinally extending body are formed by flexible strap sections 40, 42. As particularly shown in FIG. 1A, the fixed length section is attached to the strap connector at a looped end 44 and is attached to the upper hook at the upper end, and the variable length section is attached to the handle at its fixed end 46 and extends through the strap adjuster portion of the buckle to its free end 48. In FIG. 1B, the handheld lifting device is shown when it is attached to a 5-gallon bucket with the upper hook looping over the top rim and the lower hook looping over the bottom lip. It will be appreciated that it is possible to reverse the cam buckle and flexible strap sections so the variable length section connects to the upper hook at the upper end while the fixed length section connects to the lower hook at the lower end. The flexible strap sections can be formed from nylon straps or any other strong and durable material for flexible straps. The handle and upper hook can be made from plastic to minimize the weight of the handheld lifting device although it will be appreciated that these parts could also be made from a metal, such as aluminum, or other materials, such as laminate composites.

As respectively shown in FIGS. 1C and 1D, a segment of the variable length flexible strap section 42' between the fixed end and the strap adjuster is slack in the loosened configuration and is taut in the tightened configuration. With the upper hook and the lower hook engaged with the container's top rim and bottom lip, respectively, pulling on the free end of the variable length strap shortens the portion of the variable length strap between the cam buckle and the handle. The hooks are pulled tightly against the container which securely connects the handle to the bucket. To release the handle, the cam buckle is opened so the portion of the variable length strap between the cam buckle and the handle is lengthened, allowing the hooks to be pulled away from another and disengaged from their respective mounting positions on opposite ends the container. The vertical connection of the handle according to the present invention improves upon handles in the prior art that attach around the circumference of the container because it is not prone to slipping or becoming dislodged.

The handle has a pair of sidewalls 50 posteriorly extending from the lower hook to opposite ends of the grip 18*a*, 18*b*. The lower hook has a sidewall shank 52 that laterally extends between the handle's sidewalls and longitudinally extends from the head 54 of the lower hook to its distal end 56. The distal end of the sidewall shank has an aperture 58 that is spaced a longitudinal distance ($D_L$) away from the head of the lower hook, and the grip is spaced a posterior distance ($D_P$) away from the aperture and is also spaced the longitudinal distance away from the head of the lower hook. Preferably, the longitudinal distance is greater than the posterior distance ($D_L>D_P$). The exterior side 78 of the sidewall shank has a concave arc shape 80, and the head extends anteriorly away from the exterior side of the sidewall shank. The lower hook has a series of prongs 82 that extend longitudinally from its head and form an arc-shaped groove 84 between the sidewall shank and the series of prongs.

Figure 1E:
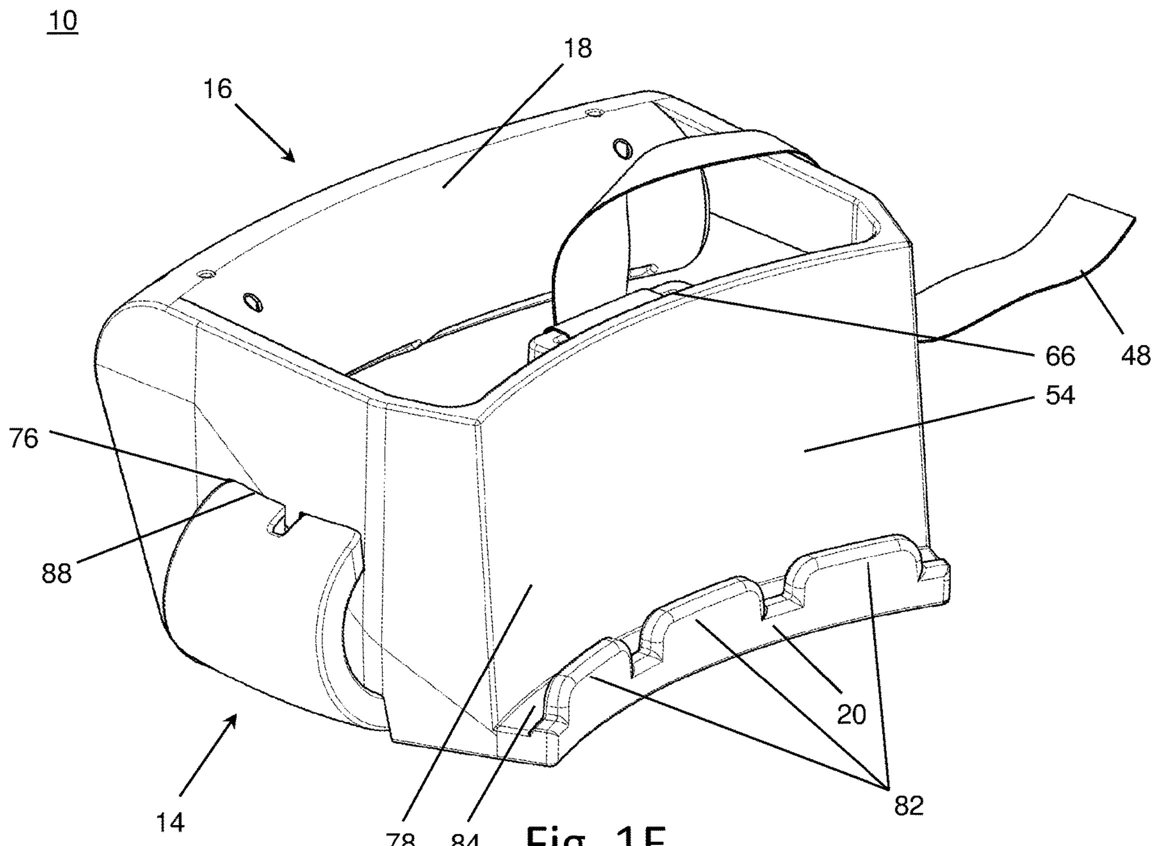
FIGS. 1E-1G are views of the handheld lifting device shown in FIG. 1 in a nested arrangement.
Figure 1F:
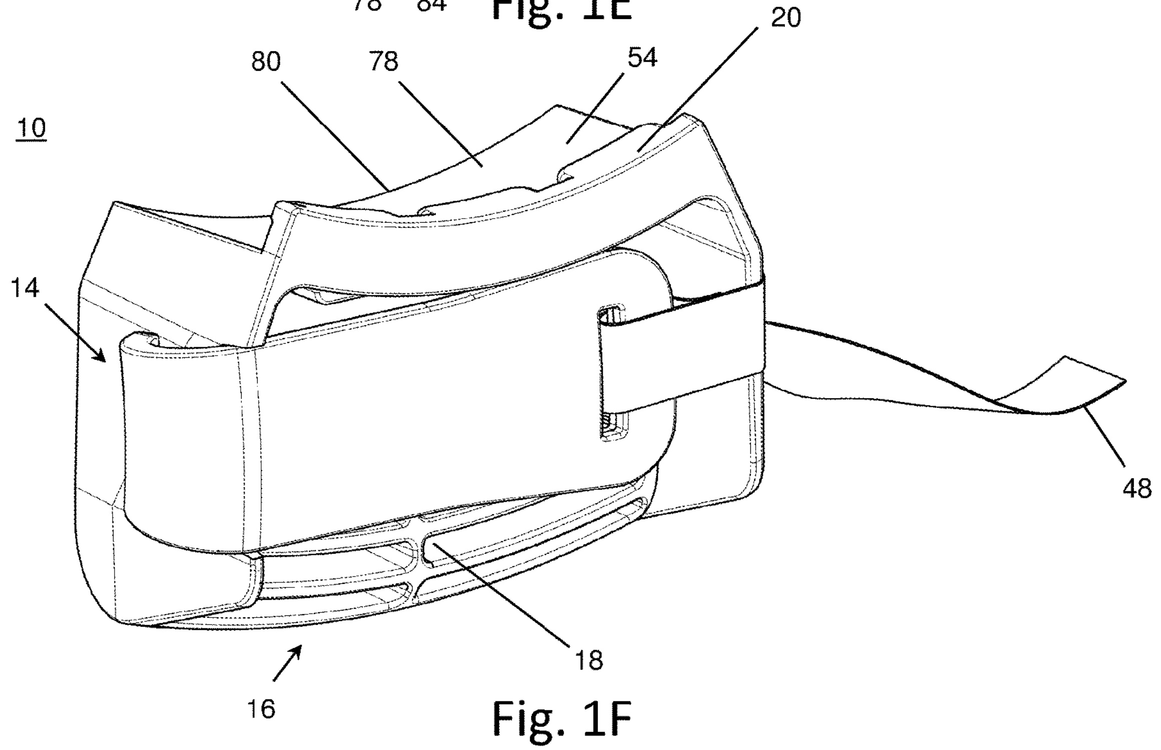
Figure 1G:
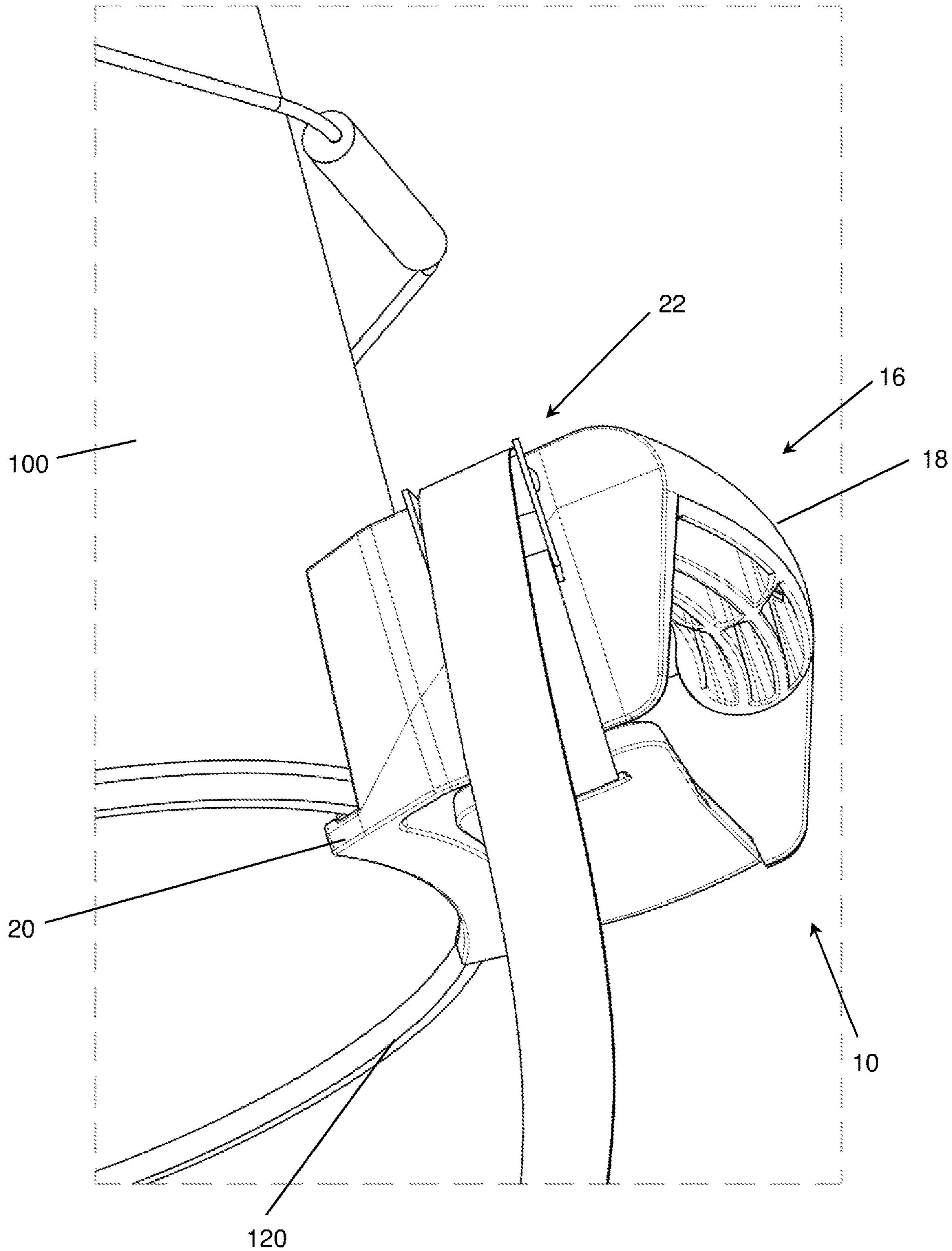

Details of the handle with the upper hook in its nested arrangement are described below with reference to FIGS. 1E and 1F. The handle's sidewalls have a sidewall width ($W_{SW}$) greater than the upper hook's shank width ($W_{Sh}$) and a sidewall length ($L_{SW}$) equal to the longitudinal distance ($L_{SW}=D_L$), and one of the sidewalls has a notch 72 in an edge 74 opposite from the grip. The notch has a depth ($d_N$) that is greater than half the thickness ($T_{Sh}$) of the upper hook's shank and is preferably equal to or no greater than the upper hook's thickness and has a length ($L_N$) that is longer than the shank width by less than the shank thickness ($L_N>W_{Sh}$, $L_N+T_{Sh}<W_{Sh}$). The upper hook's shank nests in the notch to provide a stowed configuration with the lower hook. The sidewall with the notch preferably includes a recess 76, and a tip 88 of the upper hook's head nests in the recess in the stowed configuration. When the upper hook is in the stowed configuration with the handle, the variable length flexible strap section can be tightened further so the upper hook's shank and tip are securely held within the notch and recess, respectively. The upper hook's tip can be bifurcated, and the recess can be a pair of indentations corresponding with the tines 90 in the bifurcated tip. Additionally, the upper hook's shank can be curved, and the notch can also have this curvature. As shown in FIG. 1G, the handle with the lower hook can be used to hold the bottom lip of the bucket even when the handle and upper hook are in the nested arrangement so the upper hook is not connected to the top rim.

The lower end of the variable length strap section is fixedly attached to the handle at the aperture in the distal end of the sidewall shank. Preferably, a pair of laterally spaced legs 62 extend from an interior side 64 of the sidewall shank to a platform 60, and the aperture extends longitudinally between the laterally spaced legs, the interior side of the sidewall shank, and the platform's underside 66. One portion 46*a* of the variable length strap section's fixed end passes through the aperture and another portion 46*b* of the fixed end wraps around the platform's topside 68 and is sewn to the strap section extending between the cam buckle and the aperture so the fixed end is fixedly attached to the platform.

Figure 2A:
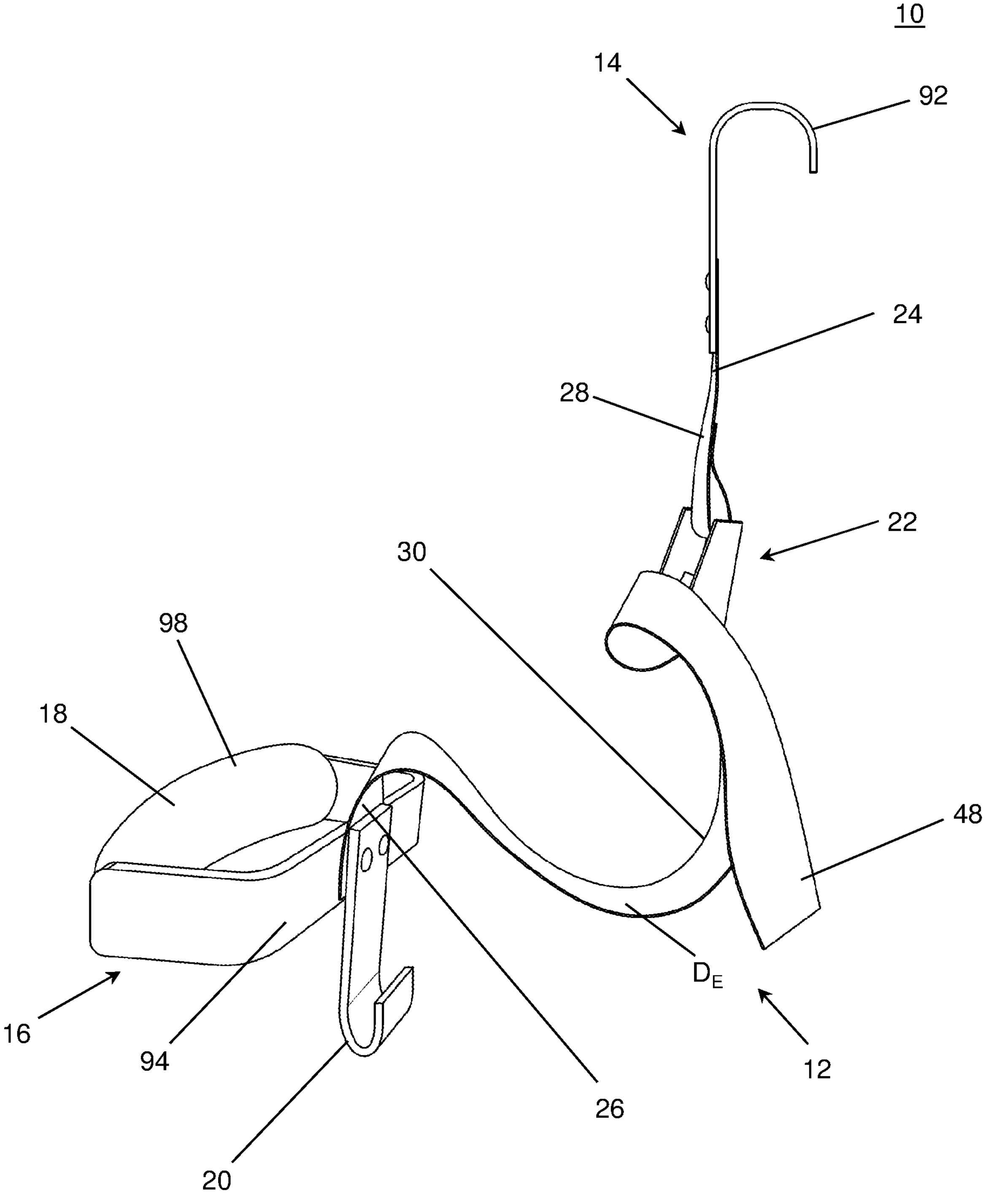
FIGS. 2A and 2B are views of an alternative embodiment of the handheld lifting device according to the present invention.
Figure 2B:
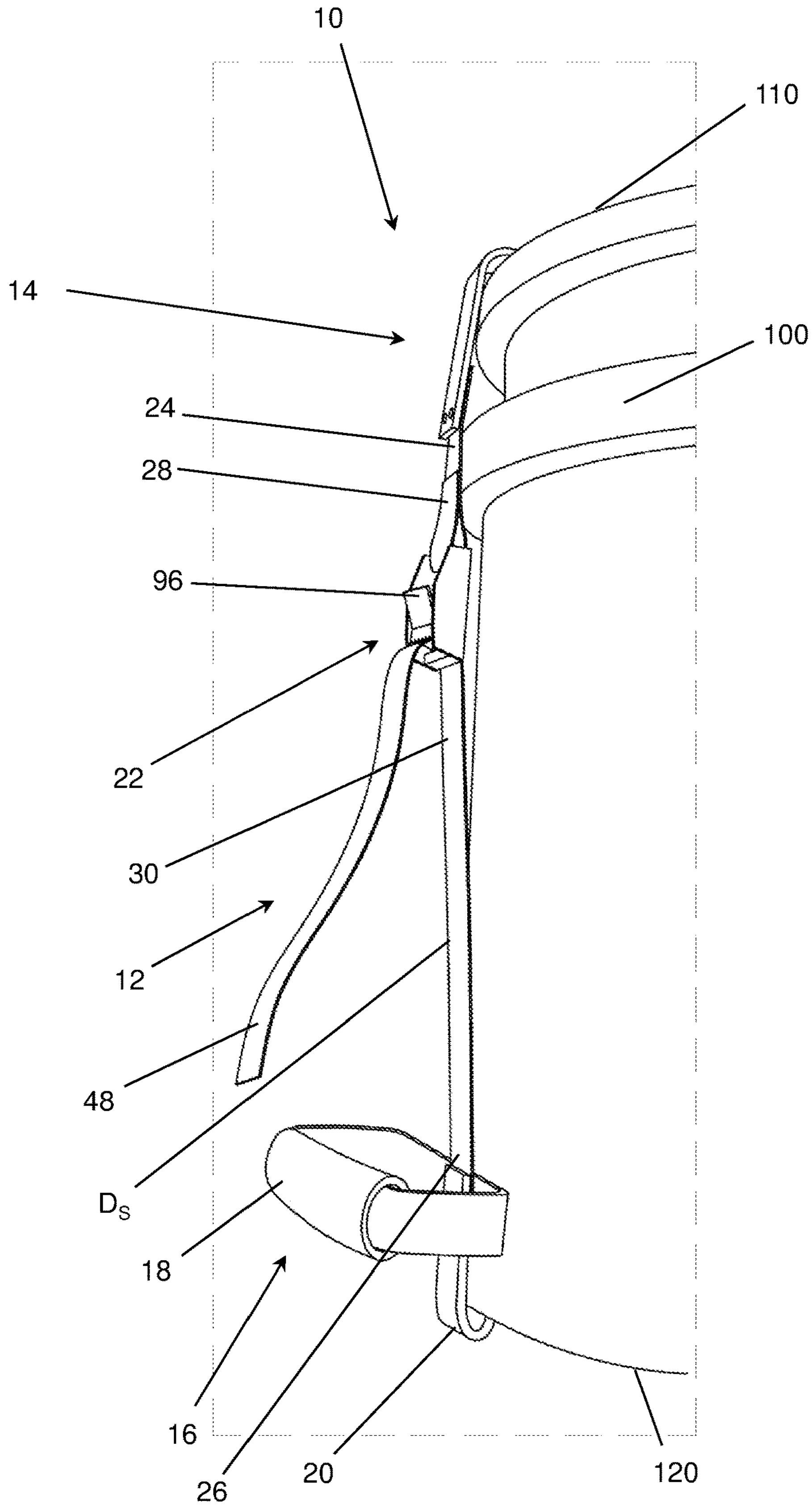

An alternative embodiment of the handheld lifting device is shown in FIGS. 2A and 2B. As in the preferred embodiment described above, the handle includes the grip and the lower hook. However, in this embodiment, the lower hook is a simple J-hook 92 without any lateral curvature that is fastened to a base section 94 of the grip, and the fixed end of the variable length strap section is held between the hook's shank and the base section. The upper hook preferably has a wider "J" cross-sectional shape than the lower hook so it can fit over the container's top rim even when a lid is on the container, and it is fastened to the fixed length strap section. The fastening of the lower hook to the base section and the fixed length strap section to the upper hook preferably use rivets. The lower hook in this embodiment is approximately 1" wide with a ½"throat length and a ¼" gap at the opening between the tip of the hook and the shank which is sufficient to catch the exterior lip on the bottom of a bucket. The upper hook in the preferred embodiment is ½"wide, with a ¾" throat length and a 1¼" gap at the opening between the tip of the hook and the shank so it will fit over the top rim of most 5-gallon buckets with or without a lid. The fastener is spaced approximately 5" from the top bend of the upper hook. The fastener can be a cam buckle as in the embodiment described above or it could be another type of fastener, such as a buckle that has a ratchet 96.

In this alternative embodiment, the handle has a "D" loop shape that is ½" wide with a contoured comfort grip 98 that is connected by sidewalls to its base section. The base section is securely fastened to the end of the lower hook's shank which is approximately 2" from its bottom bend. The grip is spaced posteriorly away from the shank by a distance approximately equal to the longitudinal distance ($D_L$) to the bottom bend, i.e., approximately 2", to provide enough clearance for the user to grasp the grip when it is attached to the bottom of the bucket. The "D" shaped grip is ½"wide, and the "D" shaped grip and the hooks can be made from ⅛" aluminum flat stock but could be made from other materials having other dimensions without departing from the inventive aspects described herein.

In yet another alternative embodiment, a rigid bar and a ratchet mechanism can be used for the longitudinally extending body and fastener, respectively, rather than using the flexible strap and buckle. An example of a rigid bar and ratchet mechanism is disclosed in U.S. Pat. No. 8,177,203 which is incorporated by reference. One hook is fixedly attached to the fixed handle which has the ratchet, and the other hook is attached to the distal end of the rigid bar. The trigger portion of the ratchet is depressed to pull the proximal end of the bar further into the handle, thereby causing the hook on its distal end to move closer to the hook attached to the handle. The ratchet can be released to allow the bar to slide back out from the ratchet, increasing the distance between the hook on the bar's distal and the hook attached to the handle, thereby allowing the hooks to be removed from their respective mounting positions on the container.

Regardless of the embodiment, the handheld lifting device improves on existing handles wherein products in the prior art that have a rigid handle attachment are larger in size, limiting storage and transport when not in use. These products are more cumbersome to attach and do not allow for one handed attachment, which is possible with either a rigid or pliable handheld lifting device because the handle vertically attaches to the container with the hooks being connected independently of each other, and the fastener subsequently longitudinally extending body in its tightened configuration when the hooks are connected to the top rim and bottom lip.

Although the handheld lifting device described herein is optimized for operation with a five gallon (5 gal.) bucket, it will be appreciated that the device can be used with many types of containers that can have a range of heights and diameters and may even have different cross-sectional shapes. The containers do not necessarily require a lid because the upper hook can be secured over the rim of the bucket. The containers preferably have a lip around their bottom to secure the lower hook. Accordingly, the size, shape, and circumference of the container is not intended to be limiting since the handle attaches vertically and not around the circumference of the container.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. For example, the buckle could be a simple loop or ring while the flexible strap could have hook and loop fasteners to keep the strap taut in the tightened configuration, such as disclosed in U.S. Pat. No. 7,284,777 which is incorporated by reference herein. Also, the cam buckle could be spring-loaded or a locking cam. It will also be appreciated that, in yet another embodiment of the invention, the hook at the top of the bucket could have a handle similar to the hook and handle described above for the bottom of the bucket, and this version of the handheld lifting device would be beneficial for those buckets that do not have a U-shaped handle or any other handle at the top. Thus, the breadth and scope of the present invention should not be limited by any of the above-described exemplary embodiments, but should be defined only in accordance with the following claims appended hereto and their equivalents.

What is claimed is:

1. A handheld lifting device for a container having a top rim and a bottom lip, comprising:

a longitudinally extending body comprising a first end, a second end, a fixed length section extending to one of the first end and the second end, and a variable length section connected to the fixed length section and extending to the other of the first end and the second end, wherein the first end and the second end are spaced by an extended distance in a loosened configuration of the variable length section and are spaced by a shortened distance in a tightened configuration of the variable length section, and wherein the extended distance is greater than the shortened distance;

a first hook fixedly attached to the first end of the longitudinally extending body, wherein the first hook releasably connects to the top rim of the container when the variable length section is in the loosened configuration;

a handle fixedly attached to the second end of the longitudinally extending body, wherein the handle is comprised of a grip and a second hook attached to the grip, wherein the second hook releasably connects to the bottom lip of the container when the variable length section is in the loosened configuration; and a fastener operatively connecting the variable length section to the fixed length section, wherein the fastener adjusts the length of the variable length section, and wherein the first hook and the second hook are respectively clamped to the top rim of the container and the bottom lip of the container in the tightened configuration.

2. The handheld lifting device of claim 1, wherein the fastener is selected from the group consisting of a buckle and a ratchet, and wherein the second end of the longitudinally extending body is comprised of a distal end of a flexible strap fixedly attached to the handle.

3. The handheld lifting device of claim 2, wherein the buckle is comprised of a cam buckle with a strap connector and a strap adjuster, wherein the fixed length section is comprised of a first flexible strap section attached to the strap connector at a looped end and is attached to the first hook at the first end, wherein the variable length section is comprised of a second flexible strap section attached to the handle at a fixed end and extending through the strap adjuster portion of the buckle to a free end, and wherein a segment of the second flexible strap section between the fixed end and the strap adjuster is slack in the loosened configuration and is taut in the tightened configuration.

4. The handheld lifting device of claim 1, wherein the handle is further comprised of a pair of sidewalls posteriorly extending from the second hook to opposite ends of the grip, wherein the second hook is further comprised of a sidewall shank longitudinally extending from a head of the second hook to a distal end and laterally extending between and connecting the sidewalls, and wherein the second end of the longitudinally extending body is fixedly attached to the distal end of the sidewall shank.

5. The handheld lifting device of claim 4, wherein the distal end of the sidewall shank is comprised of an aperture, wherein the aperture is spaced a longitudinal distance away from the head of the second hook, and wherein the grip is spaced a posterior distance away from the aperture and is spaced the longitudinal distance away from the head of the second hook.

6. The handheld lifting device of claim 5, wherein the distal end of the sidewall shank is further comprised of a platform and a pair of laterally spaced legs on an interior side of the sidewall shank, wherein the aperture extends longitudinally between the pair of laterally spaced legs, the interior side of the sidewall shank, and an underside of the platform, wherein the variable length section is comprised of a second flexible strap section with a fixed end fixedly attached to the platform, and wherein a first portion of the fixed end passes through the aperture and a second portion of the fixed end wraps around a topside of the platform.

7. The handheld lifting device of claim 5, wherein the first hook is comprised of a shank with a shank width and a shank thickness, wherein the sidewalls of the handle have a sidewall width greater than the shank width, wherein one of the sidewalls has a notch in an edge opposite from the grip, wherein the notch has a depth greater than half the thickness of the shank and a length longer than the shank width by less than the shank thickness, and wherein the shank of the first hook is nested in the notch in a stowed configuration with the second hook.

8. The handheld lifting device of claim 7, wherein the sidewall with the notch is further comprised of a recess, and wherein a tip of the first hook nests in the recess in the stowed configuration with the second hook.

9. The handheld lifting device of claim 7, wherein an exterior side of the sidewall shank has a concave arc shape between the sidewalls of the handle.

10. The handheld lifting device of claim 9, wherein the head of the second hook extends anteriorly away from the exterior side of the sidewall shank, and wherein the second hook is further comprised of series of prongs extending longitudinally from the head and forming an arc-shaped groove between the sidewall shank and the series of prongs.

11. A handheld lifting device for a container having a top rim and a bottom lip, comprising:

a longitudinally extending body comprising a first end, a second end, a fixed length section extending to one of the first end and the second end, and a variable length section connected to the fixed length section and extending to the other of the first end and the second end, wherein the first end and the second end are spaced by an extended distance in a loosened configuration of the variable length section and are spaced by a shortened distance in a tightened configuration of the variable length section, and wherein the extended distance is greater than the shortened distance;

a first hook fixedly attached to the first end of the longitudinally extending body, wherein the first hook releasably connects to the top rim of the container when the variable length section is in the loosened configuration;

a handle fixedly attached to the second end of the longitudinally extending body, wherein the handle is comprised of a grip, a second hook attached to the grip, and a pair of sidewalls posteriorly extending from the second hook to opposite ends of the grip, wherein the second hook releasably connects to the bottom lip of the container when the variable length section is in the loosened configuration, wherein the second hook is further comprised of a sidewall shank laterally extending between and connecting the pair of sidewalls and longitudinally extending from a head of the second hook to a distal end, and wherein the second end of the longitudinally extending body is fixedly attached to the distal end of the sidewall shank; and a fastener operatively connecting the variable length section to the fixed length section, wherein the fastener adjusts the length of the variable length section, and wherein the first hook and the second hook are respectively clamped to the top rim of the container and the bottom lip of the container in the tightened configuration.

12. The handheld lifting device of claim 11, wherein the fastener is comprised of a cam buckle with a strap connector and a strap adjuster, wherein the fixed length section is comprised of a first flexible strap section attached to the strap connector at a looped end and is attached to the first hook at the first end, wherein the variable length section is comprised of a second flexible strap section attached to the handle at a fixed end and extending through the strap adjuster portion of the buckle to a free end, and wherein a segment of the second flexible strap section between the fixed end and the strap adjuster is slack in the loosened configuration and is taut in the tightened configuration.

13. The handheld lifting device of claim 11, wherein the first hook is comprised of a shank with a shank width and a shank thickness, wherein the sidewalls of the handle have a sidewall width greater than the shank width, wherein one of the sidewalls has a notch in an edge opposite from the grip, wherein the notch has a depth greater than half the thickness of the shank and a length longer than the shank width by less than the shank thickness, and wherein the shank is nested in the notch in a stowed configuration with the second hook.

14. The handheld lifting device of claim 11, wherein the distal end of the sidewall shank is further comprised of a platform with a pair of laterally spaced legs on an interior side of the sidewall shank and an aperture extending longitudinally between the pair of laterally spaced legs, the interior side of the sidewall shank, and an underside of the platform, wherein the variable length section is comprised of a second flexible strap section with a fixed end fixedly attached to the platform, and wherein a first portion of the fixed end passes through the aperture and a second portion of the fixed end wraps around a topside of the platform.

15. The handheld lifting device of claim 11, wherein the second end of the longitudinally extending body is comprised of a distal end of a flexible strap fixedly attached to the distal end of the sidewall shank.

16. A handheld lifting device for a container having a top rim and a bottom lip, comprising:

a longitudinally extending body comprising a first end, a second end, a fixed length section, and a variable length section, wherein the fixed length section is comprised of a first flexible strap extending to one of the first end and the second end, wherein the variable length section is comprised of a second flexible strap connected to the first flexible strap and extending to the other of the first end and the second end, wherein the first end and the second end are spaced by an extended distance in a loosened configuration of the variable length section and are spaced by a shortened distance in a tightened configuration of the variable length section, and wherein the extended distance is greater than the shortened distance;

a first hook fixedly attached to the first end of the longitudinally extending body, wherein the first hook releasably connects to the top rim of the container when the variable length section is in the loosened configuration;

a handle fixedly attached to the second end of the longitudinally extending body, wherein the handle is comprised of a grip and a second hook attached to the grip, wherein the second hook releasably connects to the bottom lip of the container when the variable length section is in the loosened configuration; and a buckle operatively connecting the second flexible strap to the first flexible strap, wherein a free end of the second flexible strap extends through the buckle, wherein a length of the free end extending beyond the buckle adjusts the length of the second flexible strap, and wherein the first hook and the second hook are respectively clamped to the top rim of the container and the bottom lip of the container in the tightened configuration.

17. The handheld lifting device of claim 16, wherein the buckle is comprised of a cam buckle comprising a strap connector and a strap adjuster, wherein the first flexible strap section is attached to the strap connector at a looped end and is attached to the first hook at the first end, wherein the second flexible strap section is attached to the handle at a fixed end, and wherein a segment of the second flexible strap section between the fixed end and the strap adjuster is slack in the loosened configuration and is taut in the tightened configuration.

18. The handheld lifting device of claim 16, wherein the handle is further comprised of a pair of sidewalls posteriorly extending from the second hook to opposite ends of the grip, and wherein the second end of the longitudinally extending body is a distal end of one of the first flexible strap and the second flexible strap and is fixedly attached to the handle.

19. The handheld lifting device of claim 18, wherein the second hook is further comprised of a sidewall shank laterally extending between and connecting the pair of sidewalls and longitudinally extending from a head of the second hook to a distal end, and wherein the second end of the longitudinally extending body is fixedly attached to the distal end of the sidewall shank.

20. The handheld lifting device of claim 19, wherein an exterior side of the sidewall shank has a concave arc shape between the sidewalls of the handle, and wherein the second hook is further comprised of series of prongs extending longitudinally from the head forming an arc-shaped groove between the sidewall shank and the series of prongs.

* * * * *